July 24, 1951 C. D. GAHAGAN 2,561,466

PHONOGRAPH MECHANISM

Filed Sept. 12, 1944 2 Sheets-Sheet 1

INVENTOR
Carl D. Gahagan
BY John Flam
ATTORNEY

July 24, 1951 C. D. GAHAGAN 2,561,466

PHONOGRAPH MECHANISM

Filed Sept. 12, 1944 2 Sheets-Sheet 2

INVENTOR
Carl D. Gahagan
BY John Flam
ATTORNEY

Patented July 24, 1951 2,561,466

UNITED STATES PATENT OFFICE 2,561,466

PHONOGRAPH MECHANISM

Carl D. Gahagan, Los Angeles, Calif., assignor, by mesne assignments, to Dictaphone Corporation, New York, N. Y., a corporation of New York Application September 12, 1944, Serial No. 553,715

10 Claims. (Cl. 274—13)

This invention relates to a phonograph mechanism, and especially to a device for moving a recording or reproducing head with respect to a record.

Such heads are used to carry a stylus co-operating with a record or a record blank. As the record member is moved, as by the aid of a turntable, the head is moved in a direction transverse to the motion of the record, so as to follow (in the case of a round record tablet) a spiral line. The stylus, when recording, produces or forms the undulating sound grooves; or, when reproducing, the stylus is caused faithfully to follow the previously formed track or groove.

All this is now quite common in this field. Usually a lead screw, rotating in synchronism with the turntable, engages a nut for advancing the head as the operation of recording or reproduction proceeds. In order to make it possible to disconnect the head (as, for example, to reset the head to another position, or to make it possible to remove a record member), the nut is made as a mutilated nut, so that it can be moved readily out of engagement with the lead screw. A spring or weight has usually been employed in the past for holding the nut in proper relation to the lead screw.

It is one of the objects of this invention to simplify the feed mechanism, and particularly by obviating the need of special springs, or the like, for urging the mutilated nut into operative relation with the lead screw.

When the phonograph is operated as a reproducer, the stylus mounted in the reproducer head must be left free accurately to follow the convolutions of the sound track; and this must be permitted even when the head is moved by a lead screw. For this purpose it has been common to mount the head so that it is capable of lateral compliance with the sound track. Usually such mountings include connections permitting universal movement between the head and the lead screw support.

It is another object of this invention to simplify such reproducer head mountings.

This invention possesses many other advantages, and has other objects which may be made more clearly apparent from a consideration of one embodiment of the invention. For this purpose there is shown a form in the drawings accompanying and forming part of the present specification. The form will now be described in detail, illustrating the general principles of the invention; but it is to be understood that this detailed description is not to be taken in a limiting sense, since the scope of this invention is best defined by the appended claims.

Referring to the drawings.

Figure 2:
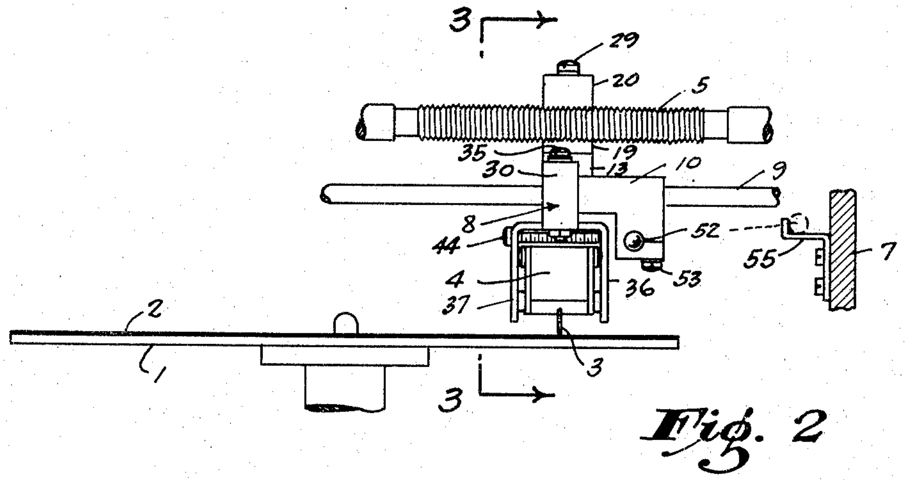
Fig. 2 is a front elevation of the mechanism illustrated in Fig. 1.

In the present instance, the mechanism includes a rotating turntable 1 (Fig. 2); and this turntable is adapted to support a member 2 capable of carrying a sound record. This member 2 may be conveniently in the form of a thin, flexible disc; and, since the mechanism to be described is specifically a reproducing mechanism, the member 2 represents a disc that carries a sound record.

Co-operating with the member 2 is a stylus 3. This stylus 3 is arranged to engage the sound track formed on the member 2. As the sound track moves past the stylus 3, the stylus is vibrated in accordance with the undulations of the track.

Figures 3, 4, 5:
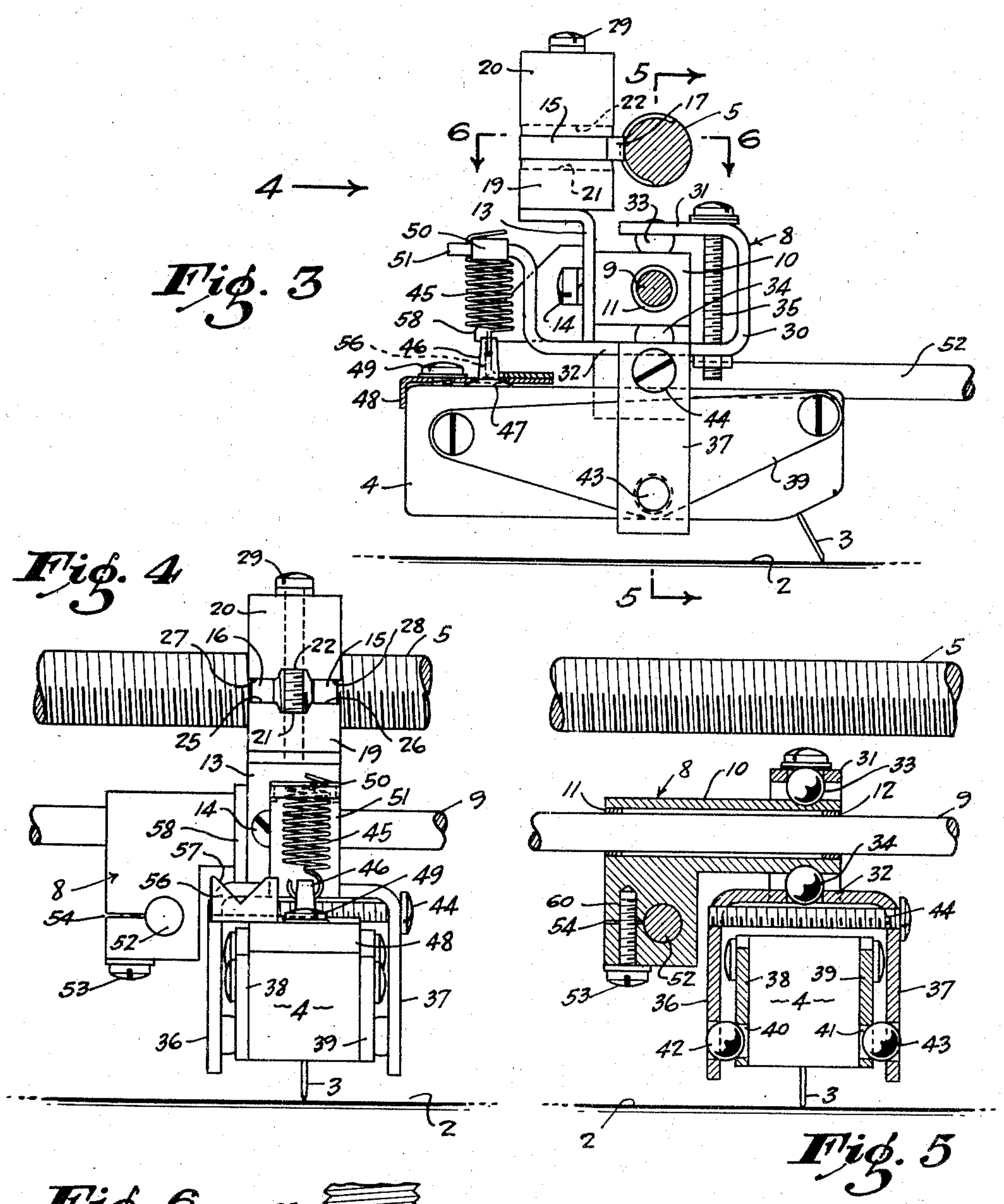
Fig. 3 is an enlarged sectional view, taken along plane 3—3 of Fig. 2.
Fig. 4 is an enlarged rear elevation, taken from the direction of the arrow 4 of Fig. 3.
Figs. 5 and 6 are sectional views, taken along correspondingly numbered planes of Fig. 3.

The vibrations thus imparted to the stylus 3 by the sound track are made effective to influence an electric circuit, as by the aid of a mechanism incorporated in a stylus head 4 (Figs. 3, 4, and 5). This circuit, in turn, transmits the resulting electrical current impulses to a sound reproducer, such as a loud speaker and its associated amplifier system.

Stylus head 4 is arranged to be moved laterally by a lead screw mechanism for maintaining the stylus 3 in alignment with the spiral sound groove. This lead screw mechanism includes a lead screw 5 having an axis transverse to the axis of the turntable 1. It is appropriately mounted for rotation as, for example, by the aid of pivot screws. One such screw 6, at the right hand end of lead screw 5, may be mounted in a wall 7 of a frame supporting the working parts of the mechanism. Furthermore, the lead screw 5 is appropriately rotated by a mechanism (not shown) so as to be driven in synchronism with the rotation of the turntable 1.

Rotation of the lead screw 5 causes movement of a support 8 (Figs. 3, 4, and 5) in a direction axial of the lead screw 5. Upon this support is mounted the stylus head 4, in a manner to be later described. Support 8 is guided by the aid of a guide rod 9 that is appropriately supported immediately beneath the lead screw 5. For this purpose, the support 8, which is of general rectangular configuration, as shown in Fig. 3, is provided with a hollow extension 10 (Fig. 5). This hollow extension 10 encircles the guide rod 9 and is slidable thereon by the aid of the bearing bushings 11 and 12 disposed at the ends of the hollow portion.

Figure 6:
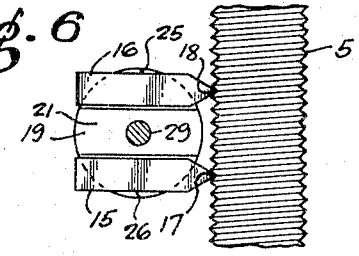

In order to move the support 8 axially of the guide bar 9 and thereby to cause traversing motion of head 4, use is made of a mutilated nut structure mounted upon the support 8. This mounting includes a bracket 13 (Figs. 3 and 4) secured to the support 8 as by one or more screws 14. This bracket 13, in a manner to be hereinafter described, serves to carry a pair of spaced magnetizable bars 15 and 16. These bars have ends with chisel-shaped edges, indicated at 17 and 18 in Fig. 6. These pointed ends are arranged to engage between the spaced turns of the thread on lead screw 5.

The bars 15 and 16 are magnetized so that their pointed ends 17 and 18 have opposite polarities; and, since lead screw 5 is purposely made from magnetic material, a strong magnetic attraction serves to hold the bars 15 and 16 in place. The pointed ends 17 and 18 of these bars form a mutilated nut urged into engagement with the lead screw 5 by magnetic force. No special care need be taken to conform the edges 17 and 18 to the threads of lead screw 5, since these threads have very small pitch and the thickness of bars 15 and 16 is insufficient to cause material deviation of the pointed ends from the helicoidal thread surfaces.

By utilizing magnetism for holding the mutilated nut structure in place, the use of springs or weights is obviated. Furthermore, vibratory forces do not affect the operative relationship between the magnetized nut structure and the lead screw 5.

The bracket 13 serves to support a pair of permanent magnets that may be made from high permeability material. These magnets influence the bars 15 and 16. They are shown by reference characters 19 and 20. These magnets are of general cylindrical configuration; but, as shown most clearly in Fig. 4, transverse grooves 21 and 22 are formed in the faces adjacent the bars 15 and 16. In this way, polar areas are defined in contact with the bars 15 and 16. The magnetism in these cylindrical magnets 19 and 20 is in such direction that the two polar areas 25 and 26 of the magnet 19 are of opposite polarity; and, similarly, polar areas 27 and 28 of the upper magnet 20 are also of opposite polarity. However, if polar area 25 is north, for example, then the polar area 27 is likewise north, whereby the point 18 is a north pole and point 17 is a south pole.

The magnets 19, 20 of the bars 15 and 16 are held in assembled relation by a central cap screw 29 that is threaded into the bracket 13.

Upon the support 8 is mounted frame member 30 (Fig. 3) which serves to support the head 4. The frame 30 is furthermore so mounted that it can swing about a vertical axis, whereby the stylus 3 may have lateral compliance; that is, it is free to follow the vagaries of the sound record groove in member 2. For thus mounting it, the frame member 30 is provided with the integrally formed arms 31 and 32 (Figs. 3 and 5) which embrace the support 8. Interposed between the hollow extension 10 of support 8 and the arms 31 and 32 are a pair of bearing balls 33 and 34. These bearing balls rest in spherical recesses in the extension 10, and are received in apertures in the arms 31 and 32.

The frame member 30 is conveniently made of sheet metal, and the arms 31 and 32 may be so arranged that, in an unstressed or free position, they diverge sufficiently to permit the ready insertion of the balls 33 and 34.

However, they may be urged toward each other to lock the balls from displacement, by the aid of the bolt 35 which passes through both arms.

The frame 30 is furthermore provided with a pair of downwardly depending arms 36 and 37, shown to best advantage in Figs. 4 and 5. These arms are formed integrally with frame 30 and embrace the head 4. The head 4 is provided with side plates 38 and 39 in which are formed the apertures 40 and 41, providing a recess for the bearing balls 42 and 43. The head 4 can, therefore, swing about the horizontal axis defined by a line between the centers of these balls.

As before, these arms 36 and 37 may be arranged to lock the balls against removal as by the aid of the screw 44 which passes through arm 37 and is threaded in arm 36. In an unstressed position the balls 42 and 43 may be readily removed or replaced.

The head 4 is furthermore urged in a clockwise direction about its horizontal axis of rotation by the aid of a tension spring 45 (Figs. 3 and 4) so as to urge the stylus 3 lightly against the record groove. The lower end of the spring 45 is attached to an anchor 46 having a head 47. This head is held in place by the metal plate 48 disposed on the top rear portion of the head 4; and the screw 49 serves to hold the plate to the head. The upper end of the spring 45 is anchored, as by the aid of a plate 50, to an arm 51 formed integrally with the frame 30.

Means are provided for lifting the stylus head 4 from the record. This is accomplished by angularly moving the support 8 about the axis of guide rod 9. For this purpose a rod-like handle 52 is utilized. This handle projects into an aperture formed in the support 8. In order to clamp the handle in place, a slot or saw-cut 54 may be provided transverse to the axis of the aperture accommodating the handle 52; and a clamping screw 53 extends across the cut 54, and is in threaded engagement with a threaded hole 60 in support 8.

Figure 1:
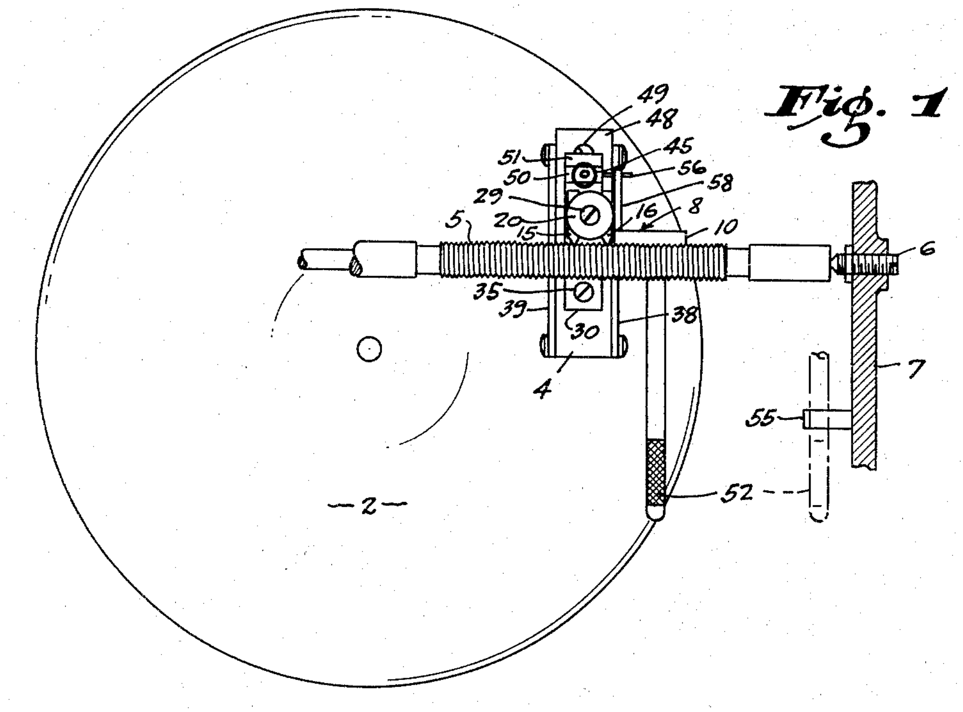
Figure 1 is a plan view, partly diagrammatic and partly in section, of a phonograph mechanism incorporating the invention.

When the handle 52 is lifted, it moves the support 8 angularly in a counter-clockwise direction, and the mutilated nut structure 15—16 is also moved out of engagement with the lead screw 5. The head 4 is likewise lifted, and the entire structure associated with support 8 may be moved in a direction axial of the lead screw 5. The handle 52 may be moved, for example, to an extreme right-hand position, as indicated by dot-and-dash lines in Figs. 1 and 2, where the head 4 is maintained in an inactive position. The handle 52 is held in elevated position on a bracket 55 fastened to the wall 7.

As support 8 is moved angularly by the aid of handle 52, the head 4 is not immediately moved upwardly out of co-operative relationship with member 2. Instead, the tension of spring 45 is first relieved, and then a positive contact between support 8 and head 4 is established. Thus, a stop member 56 (Figs. 3 and 4) is provided, attached to the top of the head 4 by the aid of the screw 49. This member 56 is provided with a notch 57 adapted to co-operate with another stop member 58 that is formed integrally with the bracket 13.

Thus, upon the first upward movement of handle 52, the bracket 51 is lowered, allowing the spring 45 to contract. As soon as this contraction progresses to a point where member 58 is fully received in notch 57, further upward movement of handle 52 serves to move the head positively to an inoperative position.

By providing a notched stopping surface 57, it is assured that, when the head 4 is lifted, it will assume a definite centralized position, such that it may properly re-engage the sound track whenever the head is returned to active position.

The inventor claims:

1. In a phonograph mechanism having a lead screw made from magnetic material, as well as means for operating said screw for moving a recorder or reproducer head transversely to the motion of a member capable of carrying a sound record, the combination therewith of a mutilated permanent magnet nut structure that is urged into engagement with the lead screw by magnetic force, and a lever assembly operable positively to disengage the nut and feed screw.

2. In a phonograph mechanism, a head adapted to co-operate with a member capable of carrying a sound record, a lead screw for traversing the head with respect to said member, means for rotating said lead screw, and a multilated nut co-operating with the screw, said nut and screw being made from magnetic material and forming a pair of threadedly engaged elements, one of said elements being magnetized for urging the nut into engagement with the lead screw.

3. In a phonograph mechanism, a head adapted to co-operate with a member capable of carrying a sound record, a lead screw for traversing the head with respect to said member, said lead screw being made from magnetic material, a guide bar parallel to the lead screw, a support for the head movable along the bar, a magnetized mutilated nut carried by the support and in engagement with the lead screw, and means for angularly moving the support about the bar for disengaging the nut and for lifting the head.

4. In a phonograph mechanism, a head adapted to co-operate with a member capable of carrying a sound record, a support for the head, a lead screw operating the support for traversing the head with respect to the member, and made from magnetic material, and a magnetized mutilated nut structure co-operating with the lead screw and carried by the support.

5. In a phonograph mechanism, a head adapted to co-operate with a member capable of carrying a sound record, a support for the head, a lead screw operating the support for traversing the head with respect to the member, and made from magnetic material, and a magnetized mutilated nut structure co-operating with the lead screw and carried by the support, comprising a pair of spaced pointed bars engaging the thread on the lead screw at spaced points, and a permanent magnet having polar areas respectively influencing said bars.

6. In a phonograph mechanism, a head adapted to co-operate with a member capable of carrying a sound record, a support for the head, a lead screw operating the support for traversing the head with respect to the member, and made from magnetic material, and a magnetized mutilated nut structure co-operating with the lead screw and carried by the support, comprising a pair of spaced pointed bars engaging the thread on the lead screw at spaced points, and a pair of permanent magnets, respectively on opposite sides of the bars and each having polar areas respectively magnetically influencing said bars so as to produce opposite polarities at their pointed ends.

7. In a mounting for a phonograph reproducer head, a support upon which the head may be mounted, a lead screw for moving said support, and a frame structure, comprising an integral member, having one set of arms embracing the support, another set of arms embracing the head, a first pivoting means between the one set of arms and the support, a second pivoting means between the other set of arms and the head, said pivoting means being transversely disposed with respect to each other, a tension spring connected to the head, and an anchor for the spring also integrally formed with said member.

8. A phonograph sound-translating assembly including: a rotatably mounted feed screw element, a guide rod mounted adjacent and parallel to said feed screw element, a sleeve-like support slidably disposed upon said rod in rockable relationship thereupon, a feed nut element carried by said support adjacent said feed screw element and rockable with said support into or out of threaded engagement with said feed screw element, said feed elements comprising magnetic material and one of said feed elements being magnetized whereby said feed elements are constrained into threaded engagement by magnetic attraction, a sound-translating head and subassembly pivotally mounted on said support whereby to provide sound-translating movements of said head through said subassembly and with respect to said support, and a resilient member having one end rockably carried with respect to said feed nut element and the other end constraining said head toward its sound-translating position.

9. A phonograph sound-translating assembly including; a rotatably mounted magnetic feed screw element, a guide rod mounted adjacent and parallel to said feed screw element, a sleeve-like support slidably disposed upon said rod in rockable relationship thereupon, a magnetic feed nut element carried by said support adjacent said feed screw element and rockable with said support into or out of threaded engagement with said feed screw element, said feed nut being magnetized normally to constrain said feed elements into threaded engagement, a sound-translating head and subassembly pivotally mounted on said support whereby to provide sound-translating movements of said head through said subassembly and with respect to said support, and a resilient member having one end rockably carried with respect to said feed nut element and the other end constraining said head toward its sound-translating position.

10. A phonograph sound-translating assembly including: a rotatably mounted feed screw element, a guide rod mounted adjacent and parallel to said feed screw element, a sleeve-like support slidably disposed upon said rod in rockable relationship thereupon, a feed nut element carried by said support adjacent said feed screw element and rockable with said support into or out of threaded engagement with said feed screw element, said feed elements comprising magnetic material and one of said feed elements being magnetized whereby said feed elements are constrained into threaded engagement by magnetic attraction, and a sound-translating head and subassembly pivotally mounted on said support whereby to provide sound-translating movements of said head through said subassembly and with respect to said support.

CARL D. GAHAGAN.

REFERENCES CITED

The following references are of record in the file of this patent:

UNITED STATES PATENTS

| Number | Name | Date |
|---|---|---|
| 750,977 | Jetter | Feb. 2, 1904 |
| 1,183,597 | Simmen | May 16, 1916 |
| 1,277,371 | Boyle et al. | Sept. 3, 1918 |
| 1,446,006 | Fletcher | Feb. 20, 1923 |
| 1,855,058 | Katscher | Apr. 19, 1932 |
| 1,891,369 | Curtis | Dec. 20, 1932 |
| 2,244,506 | Staszkiewiecz | June 3, 1941 |
| 2,293,220 | Rieber | Aug. 18, 1942 |
| 2,354,558 | Thompson | July 25, 1944 |
| 2,357,033 | Thompson, II | Aug. 29, 1944 |
| 2,455,466 | Brubaker | Dec. 7, 1948 |

FOREIGN PATENTS

| Number | Country | Date |
|---|---|---|
| 324,936 | Great Britain | Feb. 7, 1930 |
| 577,613 | Germany | June 2, 1933 |